(No Model.)
E. B. CUTTEN.
PREPARING LIQUID CHLORINE.
No. 491,699. Patented Feb. 14, 1893.
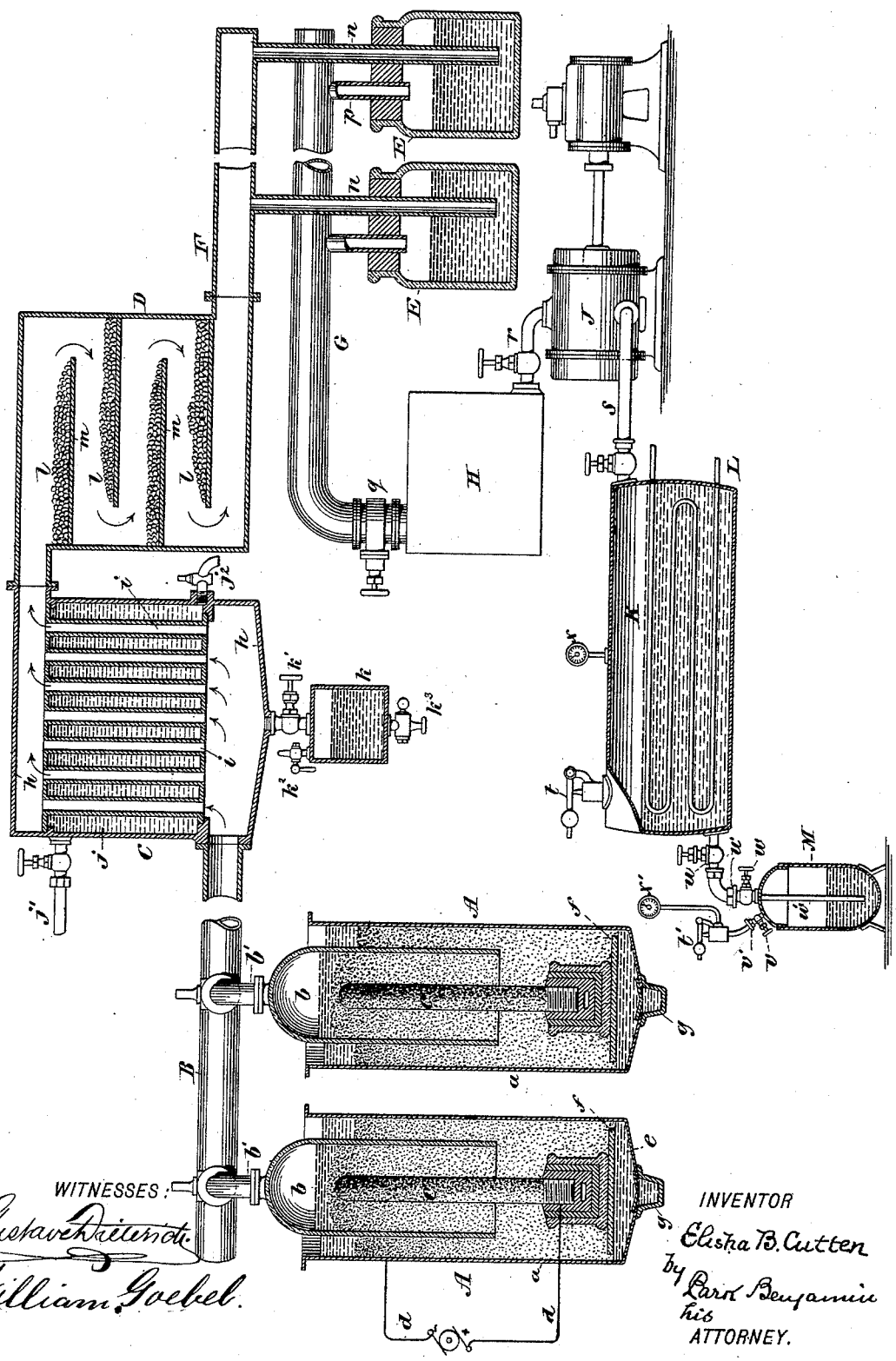

UNITED STATES PATENT OFFICE.

ELISHA B. CUTTEN, OF NEW YORK, N. Y.

PREPARING LIQUID CHLORINE.

SPECIFICATION forming part of Letters Patent No. 491,699, dated February 14, 1893.

Application filed December 30, 1891. Serial No. 416,561. (No specimens.)

*To all whom it may concern:*

Be it known that I, ELISHA B. CUTTEN, of the city, county, and State of New York, have invented a new and useful Improvement in Methods of Preparing Chlorine in Liquid Form, of which the following is a specification.

My invention relates to a new process for the preparation of chlorine in liquid form, and its storage as a new article of manufacture in suitable flasks or other receptacles from which it may be drawn for any desired utilization.

My process broadly stated consists first in thoroughly dehydrating chlorine gas and subjecting it to sufficient pressure to reduce it to a liquid. The result is the production of anhydrous liquefied chlorine which, so far as I know, is an entirely new product. It has long been known to chemists that chlorine may be liquefied by subjecting it to a sufficiently high pressure or a sufficiently low temperature, but up to the present time, so far as I am aware, this has only been done on a very small scale, and by means which are only suitable to laboratory usage.

The principal obstacle in the way of making and selling liquid chlorine in the market is found in the heavy pressure required to liquefy it, this being about sixty pounds to the square inch, at 59° Fahrenheit. The pressure increases with ordinary temperature. The result is that the liquefied chlorine cannot be safely carried in vessels of glass or earthenware, while vessels or tanks of metal having sufficient strength become rapidly corroded and so weakened and rendered useless and even dangerous. I have found that if the chlorine be rendered anhydrous and then forced into a metallic vessel which is perfectly dry within, no corrosion of the vessel will occur, and that the chlorine may not only be liquefied, but stored and transported in the liquid condition.

It is not essential to my hereinafter described process that the chlorine should be prepared in any particular way, but I find it better to obtain it in as pure a state as possible. To this end I prefer to avail myself of the process of electrolytic decomposition of common salt which is fully disclosed and described in another application for Letters Patent Serial No. 404,489 filed by me simultaneously herewith, as I find that the chlorine thus obtained is of a high degree of purity and excellently well adapted to the treatment hereinafter set forth.

In the accompanying drawing the figure shows, partly in elevation and partly in vertical section, an apparatus for carrying my aforesaid process into practical effect.

Similar letters of reference indicate like parts.

Referring to the figure, at A are shown two electrolytic cells of my invention. These are fully described in my aforesaid application for Letters Patent, and also in another application for Letters Patent Serial No. 416,562, also filed simultaneously herewith by me. The outer tanks or vessels, *a*, of these cells, are of iron and must be directly connected to one terminal of the dynamo or other source of electricity so as to form a cathode, this connection being indicated diagrammatically at *d*. The anode in the cell is a rod, *c*, of carbon, which is inserted in a block of similar material which is held in a cup as shown, which cup rests upon a horizontal partition, *f*, which is made of glass and which is located at the bottom of the vessel *a*.

*b* is a bell which may be of glass and which is supported by the pipe *b'* which extends from the chloride main B. At the bottom of the vessel, *a*, are troughs or channels, *g*, which receive the heavy solution after electrolysis. When the interior of the cell is filled with chloride of sodium, and a strong solution of the same salt is also placed in it, and when the current is established, chloride is produced at the anode, *c*, and sodium at the cathode, *a*. When the sodium combines with one equivalent of oxygen and hydrogen due to decomposition of the water to form caustic soda, the soda descends along the wall of the outer vessel down through the mass of salt and accumulates in the lower portion, *e*, of the tank, *a*, beneath the glass plate, *f*, and is drawn out at the channel, *g*. The chlorine which is generated at the anode, *c*, is drawn by the action of the pump hereinafter explained through the short pipes *b'* and into the chlorine main B. From the main, B, the gas goes to a condenser C. This consists of a chamber $j$, having numerous vertical tubes, $i$. The chamber $j$ is kept filled with ice water which enters by the pipe, $j'$, and may be drawn off at the pipe $j^2$ as soon as it is heated. The chlorine passes upward, as indicated by the arrows, through the tube $i$, when most of the moisture which it holds in suspension is condensed, and runs down into the chamber $h$ at the bottom of the condenser. Thence it may be drawn off into the vessel $k$, which is preferably made of glass. The accumulated water may be drawn off from vessel $k$ from time to time by closing the cock $k'$, opening the air-vent $k^2$, and opening the discharge-cock $k^3$. The condenser C should be made of glass, glazed earthenware or of lead. The gas now passes from condenser C to one or more dehydraters D. These dehydraters are compartments having several shelves $m$ on which is placed a quantity of calcium chloride in granular form, indicated at $l$. The effect of the chloride of calcium is to remove the larger portion of whatever moisture may remain in the gas after it has been acted upon by condenser C. This part of the apparatus may be made of lead, since the chlorine is already partially dried, and hence its corrosive action is reduced. From the dehydrater the gas continues through a pipe F which is provided with numerous branch pipes, as $n$. Each pipe, $n$, leads to the bottom of a vessel E, of which there may be several, and each vessel, E, connects by short pipes, $p$, with the main G. I place sulphuric acid in each one of the vessels, E, and as the pipe $n$ extends below the level of the acid, the gas necessarily bubbles up through it. The effect of the acid is to remove any last remaining moisture which the gas may hold which has escaped the action of the dehydrater. The flow of the gas into the receiving chamber H is regulated by the valve $q$. The receiving chamber H connects by a pipe having a valve $r$ with the compressing pump J. This pump must be made of a material which is not capable of combining chemically with anhydrous chlorine.

The object of the chamber H is to afford a reserve of gas, from which the pump may draw in order that the pulsations caused by the strokes of the pump shall not be transmitted back by the pipes G and F through the various parts of the apparatus, this being prevented by making the chamber H of sufficient capacity, and adjusting the valve $q$ to choke back the admission of gas into the chamber. The compressing pump J forces the compressed gas through the pipe into the receiving tank K, which is preferably of steel. This is provided with a relief valve $t$, and an outlet cock, $u$. It also contains a coil of pipe L through which may be forced by any convenient means cold water or other refrigerating liquid, the pipe L operating after the well-known manner of such cooling devices as are used in ice making and other refrigerating machines. The outlet $u$ being normally closed, a pressure is caused by the pump J in the tank K sufficient to liquefy the chlorine, the heat due to compression meanwhile being abstracted by the cooling coil L. The tank or cylinder for holding the liquefied chloride is shown at M and is connected by the union $u'$ to the outlet $u$ of the tank K. It is provided with a cock $v$ which by means of the union $v'$ is connected to a safety valve $t'$ set to a pressure in excess of that to which the liquefied chlorine will evaporate. The tank K is provided with a gage $x$, and a similar gage $x'$ is connected to the safety valve $t'$. In the upper part of the cylinder M is a valve $w$ which communicates with a pipe $w'$ leading to the bottom of the cylinder.

The operation of drawing off liquefied chlorine into the cylinder M is as follows: The compressed chlorine enters the cylinder and compresses the air therein until the air pressure in the cylinder and in the tank K reaches equilibrium. The valve $v$ is then opened to allow the air to escape to the safety valve $t'$ which is set to a lower pressure than the safety valve $t$ on the cylinder K. Since the outlet $u$ draws from the bottom of the tank K only liquid chlorine escapes. As soon as the pressure in the cylinder M has reached sixty pounds or thereabout to the square inch, it is certain that the chlorine admitted therein is in liquid form because any of it which may have been vaporized when first admitted has become re-condensed to a liquid. Meanwhile, the action of the condenser J keeps up the pressure in the cylinder M and this causes the confined air to be forced out of the safety valve $t'$. When the cylinder M is full, the valves $v$ and $w$ are closed, and the unions $u'$ and $v'$ are disconnected when the cylinder is ready for shipment.

When the chlorine gas is generated by my electrolytic process of decomposition of sodium chloride, it may be diluted with small quantities of oxygen and atmospheric air. These foreign substances are separated from it in the tank K; as the chlorine after compression to about sixty pounds to the square inch and on being cooled liquefies, it necessarily becomes separated from the oxygen and air, and the latter accumulates in the top of the tank above the body of liquid chlorine. The safety valve $t$ is set to a pressure sufficient in excess to that at which the chlorine liquefies at the temperature at which it is introduced into the tank, to insure that all the chlorine shall be liquefied before the pressure is raised sufficiently to open the valve. It follows that as the tank is nearly filled and as the pressure is increased the valve $t$ will be lifted, and the air and oxygen will escape. By reason of the specific gravity of the chlorine, very little or any of it, even in gaseous form, will escape at the valve $t$, but should any appear, the discharge from the condenser J may be turned into another tank, or the pressure in the tank K may be relieved by allowing the escape of its contents into a cylinder, as M.

I claim:—

1. The method of producing liquid chlorine, which consists in first passing chlorine gas in contact with chilled or cooled surfaces, and thereby causing a deposition of contained moisture; second, subjecting said gas to the action of moisture abstracting substances, and third, subjecting said gas in a closed vessel to pressure and a low temperature, substantially as described.

2. The method of preparing liquid chlorine in a marketable condition, consisting in partly dehydrating the gas by cooling, then bringing it into contact with calcium chloride, and then into contact with anhydrous sulphuric acid, and then finally forcing it into a vessel under a pressure sufficient to cause its liquefaction.

3. The method of freeing chlorine from other gases mixed therewith, which consists in subjecting the combined gases to pressure until the chlorine liquefies, and then separating the non-condensed gases from the liquid.

4. The method of preparing liquid chlorine in marketable condition free from other gases, which consists first in compressing the combined gases until the chlorine liquefies separating the non-condensed gases, and then drawing off the liquid chlorine into a hermetically sealed vessel.

5. The process of charging flasks or hermetically sealed vessels with liquid chlorine, which consists in first compressing the gas in a suitable receptacle until it liquefies, then allowing the liquid chlorine to flow from the bottom of said vessel to the bottom of said flask coupled thereto, and thereby causing said liquid chlorine to compress the air within said vessel until said pressure attains the point at which chlorine is liquefied, and then allowing said compressed air at pressures above said point to escape from said flask.

ELISHA B. CUTTEN.

Witnesses:
H. R. MOLLER,
M. BOSCH.